(12) United States Patent
Goel et al.

(10) Patent No.: US 10,395,034 B2
(45) Date of Patent: *Aug. 27, 2019

(54) DATA TRACKING IN USER SPACE

(71) Applicant: International Business Machines Corporation, Armonk, NY (US)

(72) Inventors: Prateek Goel, Bangalore (IN); Brahadambal Srinivasan, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/621,369

(22) Filed: Jun. 13, 2017

(65) Prior Publication Data

US 2017/0277893 A1  Sep. 28, 2017

Related U.S. Application Data

(63) Continuation of application No. 14/512,724, filed on Oct. 13, 2014, now Pat. No. 9,734,335, which is a (Continued)

(51) Int. Cl.
*G06F 21/12* (2013.01)
*G06F 21/16* (2013.01)
*G06F 21/52* (2013.01)
*G06F 21/55* (2013.01)
*G06F 12/14* (2006.01)
(Continued)

(52) U.S. Cl.
CPC ........... *G06F 21/566* (2013.01); *G06F 21/12* (2013.01); *G06F 21/16* (2013.01); *G06F 21/52* (2013.01); *G06F 21/54* (2013.01); *G06F 21/55* (2013.01); *G06F 21/554* (2013.01);
(Continued)

(58) Field of Classification Search
None
See application file for complete search history.

(56) References Cited

U.S. PATENT DOCUMENTS 7,634,813 B2    12/2009  Costa
7,958,558 B1 *   6/2011  Leake ................. G06F 12/1416
                                                  726/23
(Continued)

OTHER PUBLICATIONS

Aleksic et al., "IBM AIX Version 6.1 Differences Guide", International Technical Support Organization, Mar. 2008, Chapter 1, Section 1.4 ProbeVue, pp. 21-34.
(Continued)

*Primary Examiner* — Jason Chiang
(74) *Attorney, Agent, or Firm* — Isaac J. Gooshaw (57) ABSTRACT

A way to track data from an untrusted source as it moves through memory in original or modified form. A probe is placed on a data reception call of a program. When the probe is triggered by execution of the data reception call for a piece of data, a location where the piece of data is to be stored is marked. When a program instruction requests access to the marked location, instrumentation code is injected subsequent to the program instruction to track the flow of the piece of data. When the instrumentation code is executed, the next location where the piece of data will be stored is determined and marked as well. A threat analyzer is invoked to analyze the marked locations for threats.

17 Claims, 4 Drawing Sheets

Related U.S. Application Data continuation of application No. 14/482,233, filed on Sep. 10, 2014, now Pat. No. 9,734,334.

(51) Int. Cl.
*G06F 21/56* (2013.01)
*G06F 21/54* (2013.01)
*H04L 29/06* (2006.01)

(52) U.S. Cl.
CPC ...... *H04L 63/1425* (2013.01); *H04L 63/1441* (2013.01); *G06F 12/14* (2013.01); *G06F 2221/033* (2013.01)

(56) References Cited

U.S. PATENT DOCUMENTS

| | | | | |
|---|---|---|---|---|
| 8,381,192 | B1* | 2/2013 | Drewry | G06F 11/3624 712/233 |
| 8,423,965 | B2 | 4/2013 | Goel | |
| 8,584,241 | B1* | 11/2013 | Jenks | G06F 21/566 726/23 |
| 8,881,282 | B1* | 11/2014 | Aziz | G06F 21/554 726/23 |
| 2004/0030912 | A1* | 2/2004 | Merkle, Jr. | G06F 21/10 726/26 |
| 2006/0130141 | A1* | 6/2006 | Kramer | G06F 21/562 726/23 |
| 2006/0200863 | A1* | 9/2006 | Ray | G06F 12/145 726/24 |
| 2007/0107058 | A1* | 5/2007 | Schuba | G06F 11/3644 726/23 |
| 2008/0216175 | A1* | 9/2008 | Pike | G06F 21/52 726/22 |
| 2010/0011441 | A1* | 1/2010 | Christodorescu | G06F 21/53 726/24 |
| 2010/0235647 | A1* | 9/2010 | Buer | G06F 21/52 713/187 |
| 2010/0325359 | A1 | 12/2010 | Goel | |
| 2012/0255018 | A1* | 10/2012 | Sallam | G06F 12/14 726/24 |
| 2012/0297483 | A1 | 11/2012 | Boot | |
| 2013/0312103 | A1* | 11/2013 | Brumley | G06F 21/577 726/25 |
| 2016/0070912 | A1 | 3/2016 | Goel | |
| 2016/0072830 | A1 | 3/2016 | Goel | |

OTHER PUBLICATIONS

Nico, "Using DTrace to debug encrypted protocols", Aug. 24, 2009, 8 pages, <https://blogs.oracle.com/nico/entry/using_dtrace_to_debug_encrypted>.

"Antivirus software", Wikipedia, the free encyclopedia, page last modified Aug. 3, 2014 at 22:47, 16 pages, <http:/en.wikipedia.org/w/index.php?title=Antivirus_software&oldid=619734542>.

"DTrace", Wikipedia, the free encyclopedia, page last modified on Aug. 17, 2014 at 06:09, 6 pages, <http:/en.wikipedia.org/wiki/DTrace>.

"Dynamic Binary Instrumentation", Uninformed, Informative Information for the Uninformed, vol. 7, Article 1, May 2007, 2 pages, <http:/uninformed.org/index.cgi?v=7&a=1&p=3>.

"DynamoRIO Overview", Dynamic Instrumentation Tool Platform, as of Aug. 20, 2014, 1 page, <http://dynamorio.org/>.

"Intrusion detection system", Wikipedia, the free encyclopedia, page last modified on Aug. 7, 2014 at 06:28, 10 pages, <http://en.wikipedia.org/wiki/Intrusion_Detection_System>.

"ProbeVue", Wikipedia, the free encyclopedia, page last modified on Sep. 8, 2013 at 22:46, 5 pages, <http:/en.wikipedia.org/wiki/ProbeVue>.

List of IBM Patents or Patent Applications Treated as Related. Filed Jun. 13, 2017. 2 pages.

\* cited by examiner

RAM 230

|   | A | | B | | C | |
|---|---|---|---|---|---|---|
| 1 |   |   |   |   |   |   |
|   |   |   |   |   |   |   |
|   | A6&9n;)#d | t |   |   |   |   |
|   |   |   |   |   |   |   |
| 5 |   |   |   |   | 0pGbv^74nN | t |
|   |   |   |   |   |   |   |
|   |   |   |   |   |   |   |
|   |   |   | This | t |   |   |
|   |   |   |   |   |   |   |
| 10 |   |   |   |   |   |   |
|   |   |   |   |   |   |   |
|   |   |   |   |   |   |   |
|   |   |   |   |   |   |   |
|   | Is a | t |   |   |   |   |
| 15 |   |   |   |   |   |   |
|   |   |   | fE!4%*bg?:Q | t |   |   |
|   |   |   |   |   | worm | t |
|   |   |   |   |   |   |   |
|   |   |   |   |   |   |   |
| 20 |   |   |   |   |   |   |

DATA TRACKING IN USER SPACE

BACKGROUND OF THE INVENTION

The present invention relates generally to the field of computer security, and also to data flow analysis.

An intrusion detection system (IDS) is a hardware device or software application that monitors a network or system for malicious activities or policy violations and reports on its findings. A HIDS, for example, may monitor all or part of the dynamic behavior and state of a computer system, including determining whether a given program should have access to particular system resources, whether certain file system objects or regions of memory have been modified, and whether incoming network packets contain malicious or otherwise unauthorized payloads.

IDSs may be network based (NIDS) or host based (HIDS), and may function cooperatively or be integrated with an intrusion prevention system (IPS, NIPS, HIPS, etc.) to form an active intrusion detection and prevention system (IDPS) rather than serving as just a passive monitoring tool. In an era where cybercrime is recognized as a significant and growing threat, these types of systems are in widespread use among businesses and organizations of all types and sizes. Some IDSs use Deep Packet Inspection (DPI) to permit early detection of potentially dangerous payloads in incoming network packets. With DPI, the contents of data packets are decoded and inspected to a depth beyond that normally analyzed at the networking layers (that is, beyond layers 2 and 3 of the Open Systems Interconnection (OSI) model).

Signatures are often employed by IDSs and antivirus software to detect computer viruses and other types of malware. Systems using signature-based detection search for known malicious patterns within data or executable code. Some systems may also use generic signatures or other heuristics to flag slight variations from known malicious patterns as also being potentially malicious.

SUMMARY

According to an aspect of the present invention, there is a method, computer program product and/or system that performs the following steps (not necessarily in the following order): (i) configures a probe on a data reception call of a program, the probe to be triggered based on an execution of the data reception call for a piece of data; (ii) responsive to the probe being triggered, determines a first location, in a memory, where the piece of data is to be stored and marks the first location; (iii) responsive to a request by a program instruction, of an instruction execution stream, to access the marked first location, injects instrumentation code into the instruction execution stream subsequent to the program instruction, the instrumentation code being injected to facilitate tracking flow of the piece of data; (iv) responsive to execution of the instrumentation code, determines a second location, in the memory, where the piece of data is to be stored and marks the second location; and (v) invokes an analyzer to analyze the marked locations for threats.

DETAILED DESCRIPTION

Some embodiments of the present invention track user data from untrusted sources as it moves through memory in original or modified form. Memory containing this data is marked by dynamically instrumenting the user code that references it, and memory so marked is fed to a threat detection engine. The threat detection engine analyzes this subset of memory for threat signatures. Threats so found may then be reported and/or neutralized through appropriate measures. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
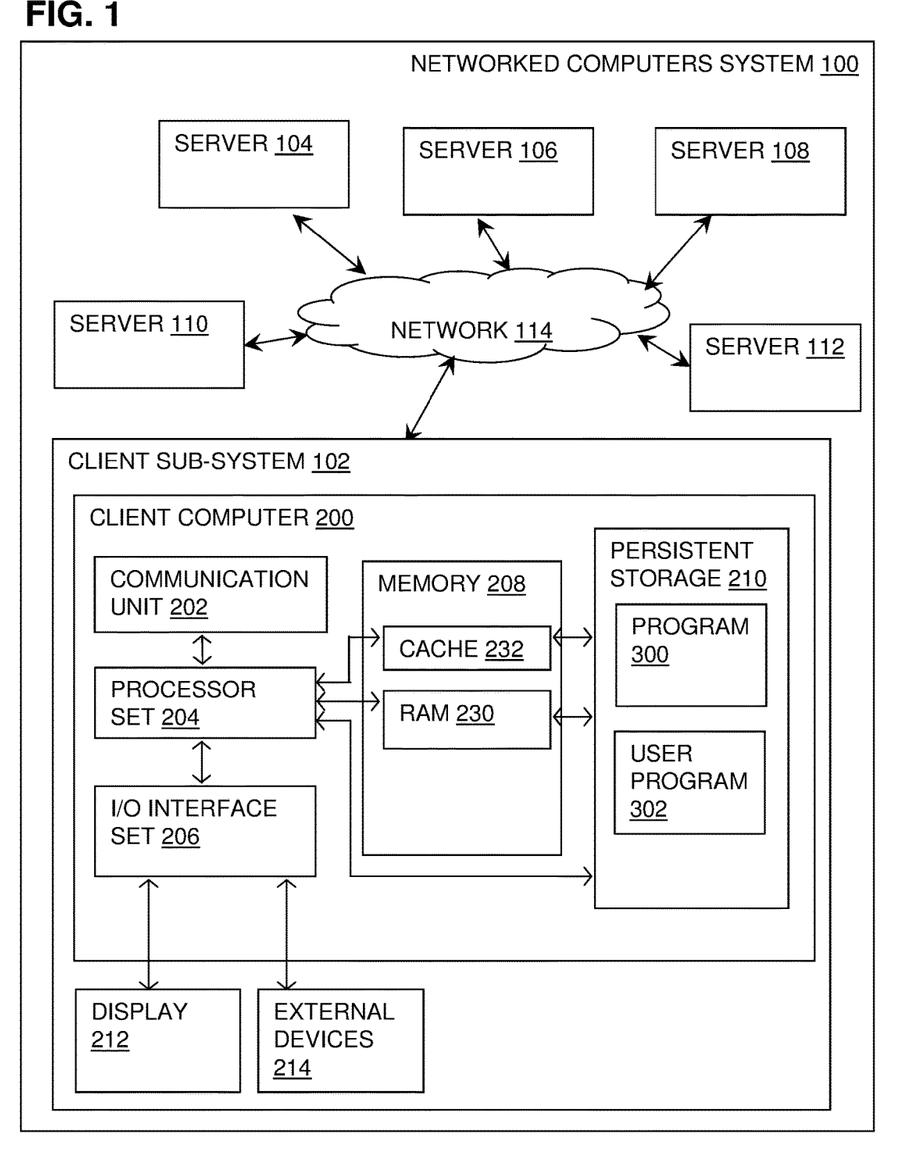
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: client sub-system 102; server sub-systems 104, 106, 108, 110, 112; communication network 114; client computer 200; communication unit 202; processor set 204; input/output (I/O) interface set 206; memory device 208; persistent storage device 210; display device 212; external device set 214; random access memory (RAM) devices 230; cache memory device 232; program 300; and user program 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202). I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
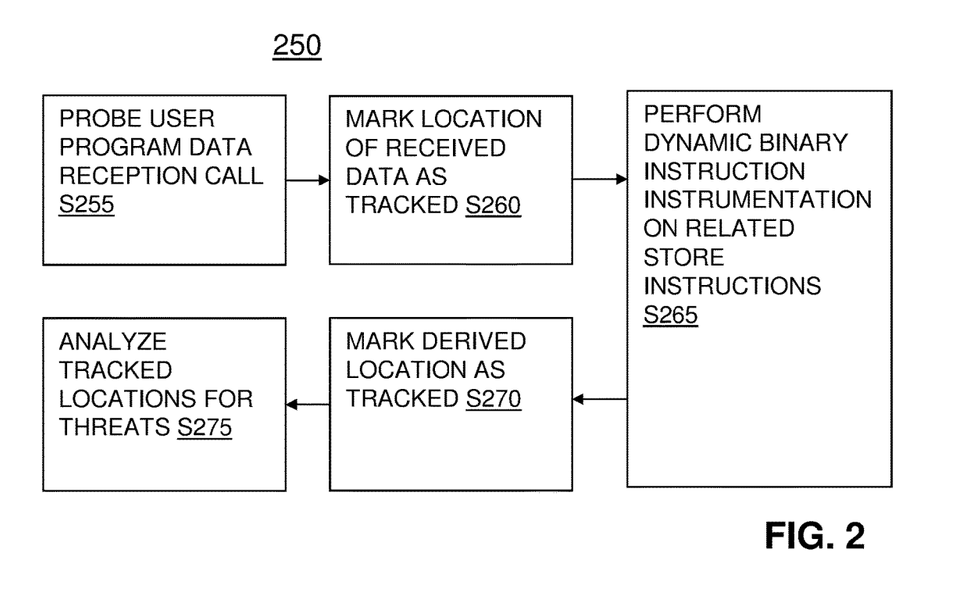
FIG. 2 is a flowchart showing a first embodiment method performed, at least in part, by the first embodiment system.
Figure 3:
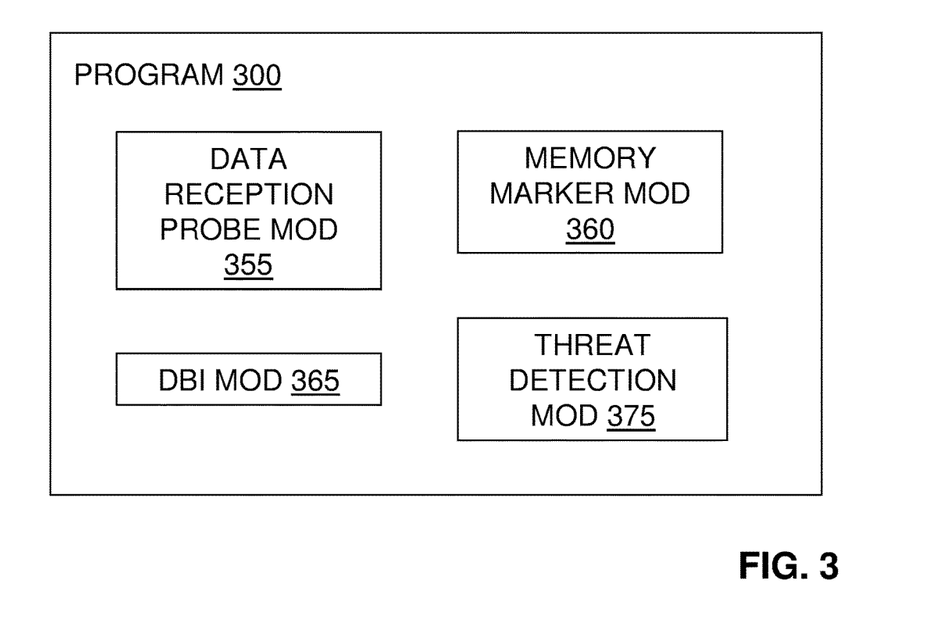
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where data reception probe module ("mod") 355 is set to monitor user program 302 (see FIG. 1) each time it requests to receive data via network 114. More generally, a probe could be set up to monitor requests for data from other sources as well, such as a hard drive, an input device, or other programs running on client computer 200, or to monitor virtually any other type of event, instruction, location, or condition. Once the probe is set, user program 302 is permitted to execute as usual until a probed event occurs.

Processing proceeds to step S260, where, when a section of code from user program 302 triggers the probe by requesting data via the network, memory marker mod 360 examines this section of the user program code to determine where the program will store the requested data. Memory marker mod 360 then instructs the system to mark this destination as being tracked.

Figure 4:
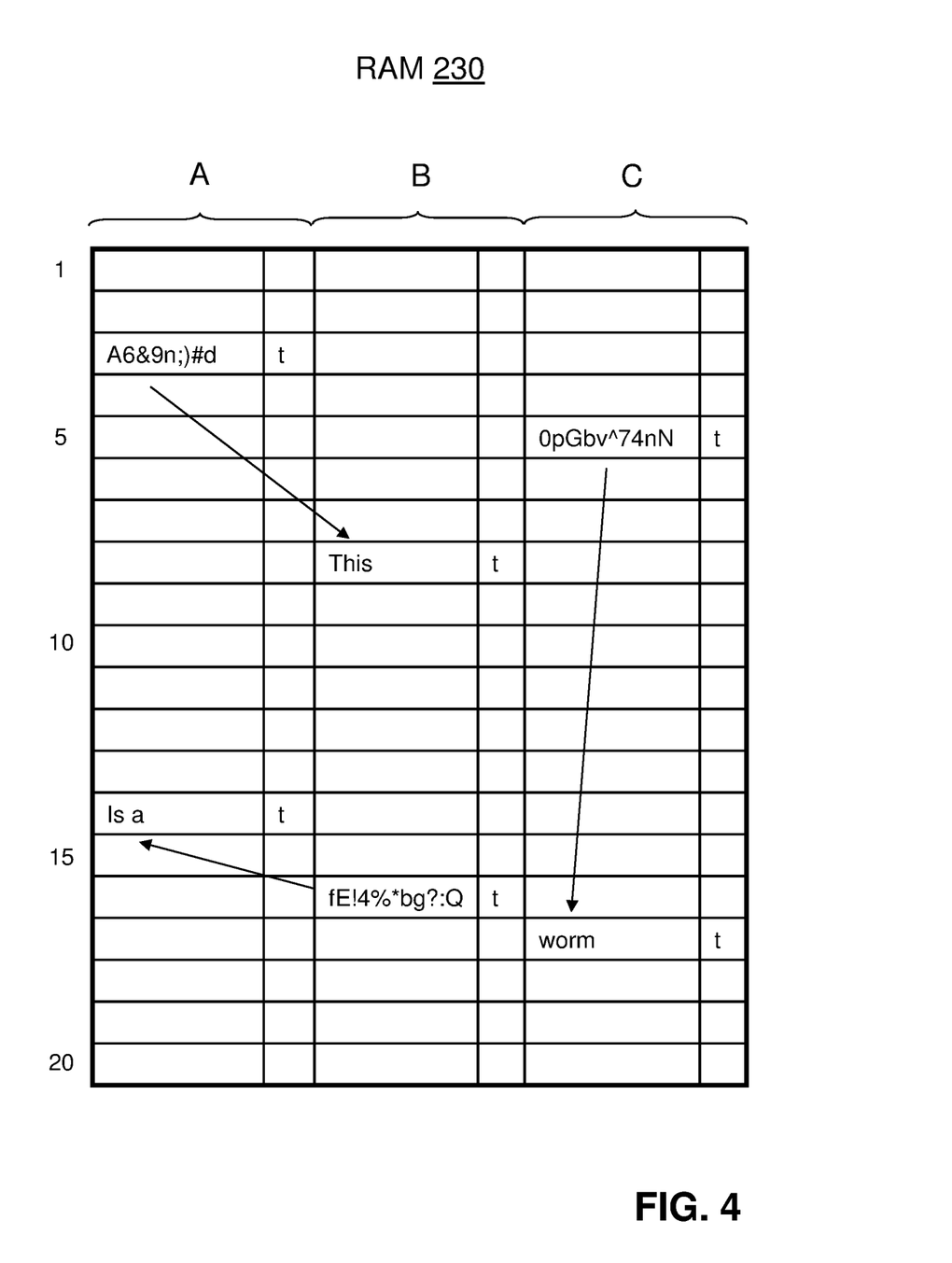
FIG. 4 is a diagram view of memory showing information that is generated by and/or helpful in understanding the first embodiment system.

For example, user program 302 may request a packet of data received over the network from server 104 (see FIG. 1) that happens to contain "A6&9n;)#d." This data request activates memory marker mod 360, which inspects the triggering section of user program 302 and determines that user program 302 will store this data in memory location A3. Memory marker mod 360 therefore instructs the system to mark memory location A3 with a 't' to indicate that this memory location is being tracked. This scenario is illustrated in FIG. 4 (explained in more detail below).

In general, the marking may be done in various ways, markings are not necessarily physically or logically adjacent to the memory marked, and memory may be marked at one or more levels of granularity (such as by byte, by word, by page, and so forth). Moreover, 'memory' may include any type of storage where data is maintained, such as a register, cache, RAM, hard disk, optical disk, and so on. Once the memory has been marked, user program 302 is permitted to continue executing until it attempts to access a marked memory location.

Processing proceeds to step S265, where, when user program 302 attempts to access a marked memory location, control is passed to dynamic binary instrumentation (DBI) mod 365. Dynamic Binary Instrumentation (DBI) is a means of modifying binary code at runtime for purposes such as monitoring program state or behavior. DBI injects instrumentation code into a program at runtime, which executes as part of the normal instruction stream of the program after it is injected. Such instrumented tracing capability is dynamic because the instrumentation is performed at runtime, without requiring any modification of the binary (executable) files or source code of the program being instrumented.

DBI mod 365 examines the section of code from user program 302 that requested the marked memory access and determines one or more subsequent instructions in the code that store the data from that memory location (or data created as a result of its manipulation, transformation, or use in or in conjunction with one or more instructions). DBI mod 365 injects instrumentation code just prior to these store instructions, then returns control to the user program.

Generally speaking, marked data may be used in any number of ways. It may be copied, modified, combined with other data, compared with other data, or used as a direct or indirect address or offset, to name a few examples. DBI mod 365 may inject instrumentation code anywhere along the code path of user program 302 to help it monitor the flow and use of marked data. Attempted accesses of marked memory that trigger this step may be by the same user program or by some other program or system component.

Processing proceeds to step S270, where control is passed to memory marker mod 360 when the instrumentation code injected by DBI mod 365 into user program 302 is hit. As memory marker mod 360 can now resolve the storage address, it again instructs the system to mark this new memory address as tracked. Steps S265 and S270 may be repeated any number of times to track a particular segment of data as it is used, transformed, and/or moved around in memory.

Continuing with the example of FIG. 4, the data from marked memory location A3 is tracked as discussed above, eventually leading to the data "This" in memory location B8 being marked as tracked. A similar process occurs for data requested from servers 106 and 108 (see FIG. 1) and initially placed in locations B16 and C5, respectively, leading to derived data in locations A14 and C17 also being marked as tracked.

Processing proceeds to step S275, where threat detection mod 375 is periodically invoked to scan all marked memory locations for threats. In the example from FIG. 4, only locations A3, A14, B8, B16, C5, and C17 (plus any intermediate locations marked as tracked but not shown in the Figure) will be scanned because these are the only memory locations marked as being tracked. Scanning only the subset of memory locations marked as tracked improves performance of the threat detection system by reducing the extent of memory that must be scanned. Moreover, the data initially stored at locations A3, B16, and C5 together represent malicious code, but would not have been found to be such by inspection of each data segment either individually or collectively, because these data segments were encrypted. However, by tracking all these pieces of data on client computer 200 as they move through memory and are eventually decrypted, threat detection mod 375 is able to discover the threat they collectively represent. Once a potential threat is identified, an alert can be generated and/or defensive measures can be automatically taken.

In general, the threat detection component of the system may be invoked by various triggers, including the passage of a periodic amount of time, the accessing of a certain number of tracked memory locations, access by or to a certain component or system resource, the execution of a certain class of instructions by the user program, and so forth. Likewise, the threat itself could represent a danger to the integrity, security, or operation of the computer system itself or the data it processes, or could include potential dangers to or violations of the operation and policies of other systems. Operation of the system described herein need not be limited to the confines of a physical machine but could cover, for example, a distributed cloud-based domain, while the user program could be a single program or multiple programs, and could include any class of program or untrusted component for which this type of monitoring may be desired.

III. Further Comments and/or Embodiments

Some embodiments of the present invention recognize the following facts, potential problems and/or potential areas for improvement with respect to the current state of the art: (i) packets encrypted at the application layer go unexamined through a computer system as the system is not privy to details like how many times the packet was encrypted, what the decryption keys are at every level, and so on; (ii) host intrusion detection service (HIDS) and host intrusion prevention service (HIPS) systems remain largely blindfolded in such cases, permitting users to program applications which communicate using their defined encryption methods and conduct unauthorized or otherwise undesirable activity on the system; and/or (iii) Deep Packet Inspection (DPI) may in some cases be able to address this concern by decrypting and examining packets as they enter the system, then deciding on whether they should be allowed to flow through or not.

Nevertheless, some embodiments of the present invention recognize that two ways in which DPI may be performed are: (i) by deploying a DPI agent to act as a man in the middle (like in the familiar man-in-the-middle attack structure), keeping track of things and listening for the keys being shared, which can then be used for packet decryption; and/or (ii) by sharing of application-layer decryption properties with the DPI agent in the system; but that these approaches carry disadvantages such as: (i) reliance on a user sharing its keys; and/or (ii) key discovery dependent on the sharing of keys over the network (for example, as might be the case for command-and-control style viruses).

Some embodiments of the present invention therefore take a different approach to monitoring encrypted data by ensuring that when a packet is received in the user space/application, the state of the memory where the received data is copied (for example, its page table entry, or PTE), is marked as "Being Tracked," regardless of whether the data is copied "as is" or after some transformation. In this way, a footprint of data movement ("as is" or in a transformed state) in memory can be maintained. Such marked memory can then be subjected to heightened monitoring and/or restrictions, such as by being fed to a signature analysis engine for threat detection analysis.

To achieve the above, some embodiments of the present invention may include one, or more, of the following features, characteristics and/or advantages: (i) mix page table entry (PTE) and dynamic tracing framework concepts; (ii) footprint encrypted data in user space memory to get only the subset of memory that needs to be fed to a pattern analysis engine; (iii) use a dynamic tracing framework that is easily pluggable into any component; (iv) use a dynamic tracing framework to set trace points at any location on the fly; (v) enable analysis of encrypted application-level packets without having access to the keys; and/or (vi) use a threat analysis engine to scan only a subset of memory for threats, giving a performance boost to systems running such engines.

Figure 5:
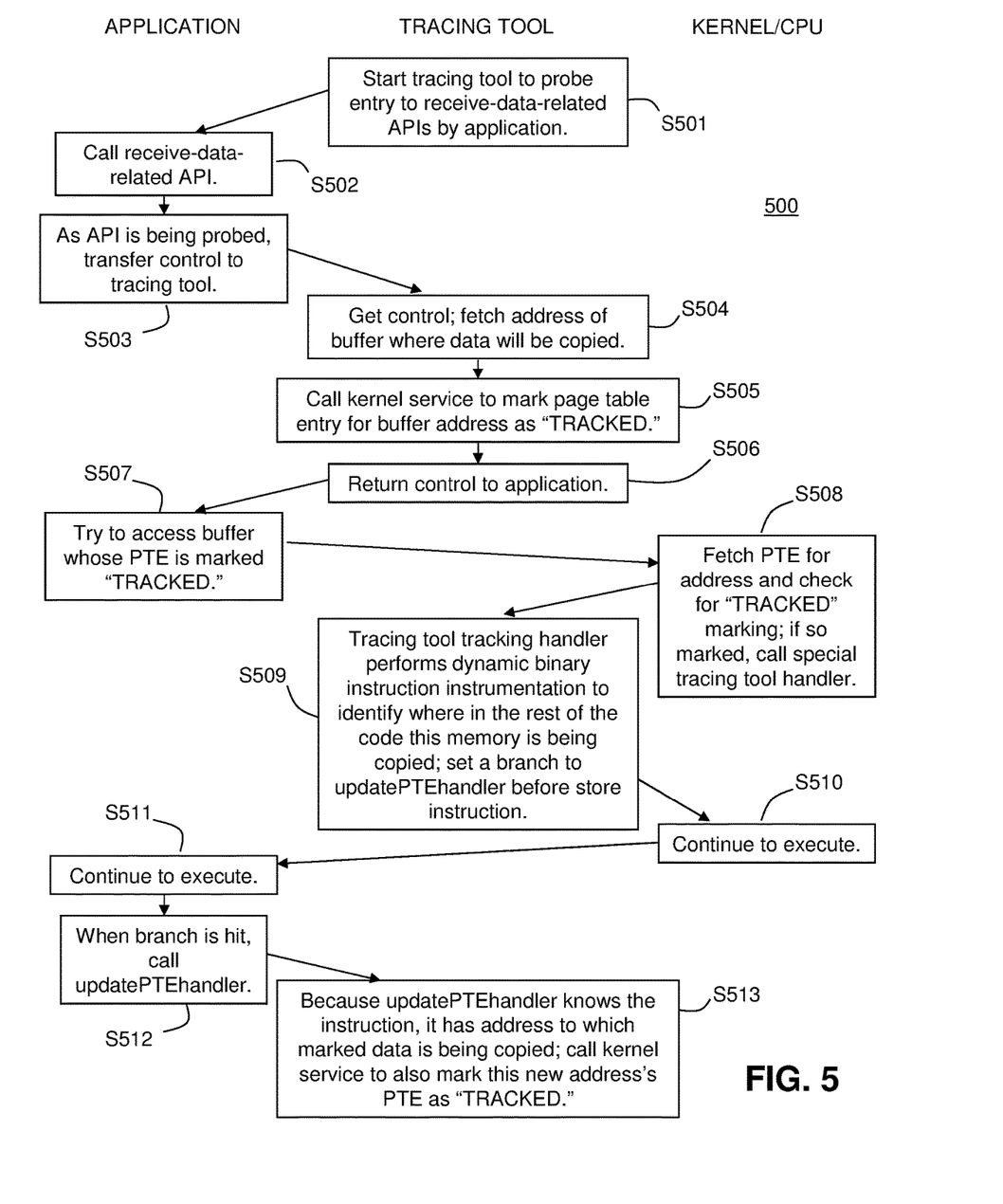
FIG. 5 is a flowchart showing a second embodiment method performed, at least in part, by a second embodiment system.

Shown in FIG. 5 is flowchart 500, showing an example of how a dynamic tracing framework can be used to selectively track data in memory. Steps are arranged into columns depending on whether they are carried out by an application (left), the dynamic tracing tool (center), or the operating system kernel/CPU (right). Processing begins at step S501, where a dynamic tracing tool is started and configured to probe entry into receive-data-related APIs by a user space program or application. When an application makes a call to such an API (step S502), control is transferred to the tracing tool (step S503). The tracing tool gains control and fetches the address of the buffer to which the incoming data will be copied (step S504), calls a kernel service to mark the page table entry (PTE) for that buffer address as "TRACKED" (step S505), then returns control to the calling program (step S506).

An attempt to access the buffer whose PTE is marked "TRACKED" (step S507) causes the operating system to fetch the PTE for the buffer address and check whether or not it is marked as "TRACKED" (step S508). If so, a special handler in the tracing tool is called to dynamically instrument the binary user program instructions in order to identify where in the rest of the code this memory is being copied or transformed, and to inject into the code a branch to a special tracing routine, updatePTEhandler, before any associated store instruction(s) that are found (step S509). This binary instruction instrumentation works by starting from the current instruction (the one attempting to access the marked buffer) and analyzing the next few instructions to see where the data in question is being copied to some other memory location in the same or transformed form.

Execution proceeds as usual (steps S510 and S511) until an injected branch instruction is encountered (step S512), at which point updatePTEhandler parses the associated store instruction to determine the address where the marked data is being stored (step S513) and calls a kernel service to also mark this new address's PTE as "TRACKED." Dynamic tracing continues on in this fashion, with the dynamic tracing tool offering a tunable option for whether a user wants to pass marked memory for pattern checking at regular intervals of time or after every copy/store of marked data. In this way, the dynamic tracing framework selectively tracks data in memory, permitting selective scanning of this data to occur and enabling detection of threat patterns that are encrypted when initially introduced in the system and only later transformed into recognizable form.

Some embodiments of the present invention recognize the following facts, potential problems and/or potential areas for improvement with respect to the current state of the art: (i) if user applications use their own encryption mechanism, there is no way conventional deep packet inspection or anti-virus software can find the data in it; and/or (ii) putting breakpoints on known functions and tracking their input and output data is impractical in the context of anti-virus or deep packet inspection techniques.

Some embodiments of the present invention may include one, or more, of the following features, characteristics and/or advantages: (i) perform encrypted packet tracking in user space; (ii) generalize the analysis of memory for any application; (iii) do not need to know names, prototypes, or entry points of functions used for encryption/decryption of data or data packets; (iv) footprint the memory; (v) rely on the footprint of data as it is moved/transformed in memory; (vi) mark memory of receive buffers as being tracked; (vii) mark memory as being tracked that is the destination of other tracked memory containing data that is being copied or transformed; (viii) track the memory regions that need to be analyzed without needing to know anything about the high-level data copy or transformation functions being used; (ix) include a tool to mark the memory where data is received over a network and build logic to track the footprint of this data; (x) employ dynamic tracing mechanisms, making plug-in and usage of the marking tool easy; (xi) mark and analyze the memory containing data derived from received packets such that deep packet inspection can be achieved even on user-encrypted packets; (xii) input tracked memory regions to an analyzing engine to determine whether they contain any potentially harmful content; (xiii) use an inspection engine that inspects marked memory on regular intervals for any know threat signatures; (xiv) can be used against command-and-control style attacks; and/or (xv) provide enhanced capability and effectiveness over conventional alternatives.

Some embodiments of the present invention deal with memory which can be kept anywhere, and any other memory locations which have derived content from memory already marked dirty. They keep track of wherever marked memory is being copied, whether in the same form or after processing has been done on it. Moreover, some embodiments do not tie their operation to system call arguments or branch instruction addresses. For example, a user application receiving data over a network may never pass that data to a system call or branch instruction, instead keeping that data to itself and passing some other data as a parameter to a system call. Instead, some of these embodiments keep track of all memory locations of suspect data and run a memory analyzer on the marked memory to find signatures. This is useful, for example, where a worm comes in pieces from a different host or hosts, and no single piece can be detected as a worm. The memory locations where these pieces are stored are marked as dirty; then the analyzer can see it as a single entity and detect the worm.

In some embodiments of the present invention, at least part of the marking of suspect data is done by maintaining an indicator in the page table entry for the marked memory location. This memory instrumentation approach permits keeping a footprint in the page table entry, so the hardware/CPU will know whenever the marked memory is being accessed by anyone and can raise an exception to perform additional footprinting as the contents of those memory locations are accessed, used, transformed, and/or moved. Registers can be marked in a similar fashion, so that when the registers are being accessed, the CPU can likewise generate an exception to do additional footprinting. Storing the footprint information in the page table entry (and/or using some other tightly integrated footprint storage scheme that provides dedicated hardware support or physical adjacency of the markings to the associated data) saves space and is fast. This allows the CPU to know very quickly when a marked memory location is being accessed and raise the required exception, minimizing the performance overhead of the footprinting process.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine-readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Piece of data: data or executable code generated or processed by a computer system.

Data flow, flow of a piece of data: as used herein, movement of a piece of data, including relocation, duplication, and deletion of that piece of data but also including creation, deletion, and relocation of other pieces of data derived directly or indirectly from the initial piece of data, such as through addition, comparison, referencing or de-referencing, or execution.

Receiving a program instruction: includes receiving notice that the instruction is about to be executed, is executing, or has just executed.

What is claimed is:

1. A method comprising:
    marking, by a set of processors, a first location in a storage, wherein (i) the first location is a store for a set of data based, at least in part, on a first section of code in a program, (ii) the set of data is requested in a set of data requests from the program, and (iii) the program is encrypted;
    determining, by the set of processors, that a second section of code in the program attempts to access the first location;
    injecting, by the set of processors, a set of instrumentation code into the program according to a dynamic tracing framework, wherein the set of instrumentation code (i) is a dynamic binary instrumentation, (ii) is injected subsequent to the second section of code in an instruction execution stream, and (iii) does not modify the second section of code;
    determining, by the set of processors, the instrumentation code executes;
    examining, by the set of processors, the first section of code and a set of subsequent instructions in the program, wherein the set of subsequent instructions references the first location;
    scanning, by the set of processors, the first location for a set of threats;
    determining, by the set of processors, the set of threats exist; and
    taking, by the set of processors, a defensive measure.

2. The method of claim 1, further comprising:
    determining, by the set of processors, the instrumentation code is triggered by a second section of code in the program;
    determining, by the set of processors, a second location where the first section of code will store a set of data requested in the set of data requests; and
    marking, by the set of processors, the second location;
    wherein:
        the set of subsequent instructions reference the second location, and
        scanning the first location for the set of threats further includes:
            scanning, by the set of processors, the second location for the set of threats.

3. The method of claim 1, further comprising:
    tracking, by the set of processors, responsive to marking the first location, the first location.

4. The method of claim 1, wherein scanning the first location for the set of threats employs signature analysis.

5. The method of claim 1, further comprising:
    tracking, by the set of computer processors, a flow of the set of data.

6. The method of claim 5, wherein tracking the flow of the set of data further includes:
    maintaining, by the set of processors, a set of indicators in a page table entry associated with the first location.

7. A computer program product comprising:
    a computer readable storage medium having program instructions stored thereon, the program instructions comprising:
        program instructions executable by a device to cause the device to mark a first location in a storage, wherein (i) the first location is a store for a set of data based, at least in part, on a first section of code in a program, (ii) the set of data is requested in a set of data requests from the program, and (iii) the program is encrypted;
        program instructions executable by a device to cause the device to determine a second section of code in the program attempts to access the first location;
        program instructions executable by a device to cause the device to inject a set of instrumentation code into the program according to a dynamic tracing framework, wherein the set of instrumentation code (i) is a dynamic binary instrumentation, (ii) is injected subsequent to the second section of code in an instruction execution stream, and (iii) does not modify the second section of code;
        program instructions executable by a device to cause the device to determine the instrumentation code executes;
        program instructions executable by a device to cause the device to examine the first section of code and a set of subsequent instructions in the program, wherein the set of subsequent instructions references the first location;
        program instructions executable by a device to cause the device to scan the first location for a set of threats;
        program instructions executable by a device to cause the device to determine the set of threats exist; and
        program instructions executable by a device to cause the device to take a defensive measure.

8. The computer program product of claim 7, further comprising:
program instructions executable by a device to cause the device to determine the instrumentation code is triggered by a second section of code in the program;
program instructions executable by a device to cause the device to determine a second location where the first section of code will store a set of data requested in the set of data requests; and
program instructions executable by a device to cause the device to mark the second location;
wherein:
the set of subsequent instructions reference the second location, and
program instructions to scan the first location for the set of threats further includes:
program instructions executable by a device to cause the device to scan the second location for the set of threats.

9. The computer program product of claim 7, further comprising:
program instructions executable by a device to cause the device to track, responsive to program instructions to mark the first location, the first location.

10. The computer program product of claim 7, wherein program instructions to scan the first location for the set of threats employs signature analysis.

11. The computer program product of claim 7, further comprising:
program instructions executable by a device to cause the device to track a flow of the set of data.

12. The computer program product of claim 11, wherein program instructions to track the flow of the set of data further include:
program instructions executable by a device to cause the device to maintain a set of indicators in a page table entry associated with the first location.

13. A computer system comprising:
a processor set; and
a computer readable storage medium;
wherein:
the processor set is structured, located, connected, and/or programmed to execute instructions stored on the computer readable storage medium; and
the instructions include:
program instructions executable by a device to cause the device to mark a first location in a storage, wherein (i) the first location is a store for a set of data based, at least in part, on a first section of code in a program, (ii) the set of data is requested in a set of data requests from the program, and (iii) the program is encrypted;
program instructions executable by a device to cause the device to determine a second section of code in the program attempts to access the first location;
program instructions executable by a device to cause the device to inject a set of instrumentation code into the program according to a dynamic tracing framework, wherein the set of instrumentation code (i) is a dynamic binary instrumentation, (ii) is injected subsequent to the second section of code in an instruction execution stream, and (iii) does not modify the second section of code;
program instructions executable by a device to cause the device to determine the instrumentation code executes;
program instructions executable by a device to cause the device to examine the first section of code and a set of subsequent instructions in the program, wherein the set of subsequent instructions references the first location;
program instructions executable by a device to cause the device to scan the first location for a set of threats;
program instructions executable by a device to cause the device to determine the set of threats exist; and
program instructions executable by a device to cause the device to take a defensive measure.

14. The computer system of claim 13, further comprising:
program instructions executable by a device to cause the device to determine the instrumentation code is triggered by a second section of code in the program;
program instructions executable by a device to cause the device to determine a second location where the first section of code will store a set of data requested in the set of data requests; and
program instructions executable by a device to cause the device to mark the second location;
wherein:
the set of subsequent instructions reference the second location, and
program instructions to scan the first location for the set of threats further includes:
program instructions executable by a device to cause the device to scan the second location for the set of threats.

15. The computer system of claim 13, further comprising:
program instructions executable by a device to cause the device to track, responsive to program instructions to mark the first location, the first location.

16. The computer system of claim 13, wherein program instructions to scan the first location for the set of threats employs signature analysis.

17. The computer system of claim 13, further comprising:
program instructions executable by a device to cause the device to track a flow of the set of data.

* * * * *